(12) United States Patent
Kao

(10) Patent No.: US 9,126,329 B2
(45) Date of Patent: Sep. 8, 2015

(54) MAGNETIC HANGING FRAME FOR SOCKET BITS

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 120 days.

(21) Appl. No.: 14/073,946

(22) Filed: Nov. 7, 2013

(65) Prior Publication Data

US 2015/0122750 A1    May 7, 2015

(51) Int. Cl.
| B25H 3/04 | (2006.01) |
| B25B 13/56 | (2006.01) |
| B25B 13/06 | (2006.01) |
| F16M 13/02 | (2006.01) |

(52) U.S. Cl.
CPC  *B25H 3/04* (2013.01); *B25B 13/06* (2013.01); *B25B 13/56* (2013.01); *F16M 13/022* (2013.01)

(58) Field of Classification Search
CPC ............ B25H 3/04; B25H 3/003; B25H 3/06; B25H 3/02; B25H 2/021; A47F 5/0846; A47F 5/0838; A47F 5/0807; A47F 5/0006; A47F 5/0853; B25B 11/002; B25B 13/06; B25B 13/56; F16M 13/022
USPC ................. 211/70.6, 60.1; 206/372, 376, 377
See application file for complete search history.

(56) References Cited

U.S. PATENT DOCUMENTS

| 3,980,384 | A | * | 9/1976 | Lawson ........................ 439/710 |
| 4,927,020 | A | * | 5/1990 | Randy ........................... 206/378 |
| 5,284,245 | A | * | 2/1994 | Slivon et al. .................. 206/378 |
| 5,544,747 | A | * | 8/1996 | Horn .............................. 206/378 |
| 5,573,116 | A | * | 11/1996 | Zink .............................. 206/378 |
| 5,645,177 | A | * | 7/1997 | Lin ............................... 211/70.6 |
| 6,431,373 | B1 | * | 8/2002 | Blick ........................... 211/70.6 |
| 6,488,151 | B2 | * | 12/2002 | Ramsey et al. ............... 206/378 |
| 7,841,480 | B2 | * | 11/2010 | Hsieh ........................... 211/70.6 |
| 7,905,354 | B1 | * | 3/2011 | Geibel ......................... 206/378 |
| 8,069,995 | B2 | * | 12/2011 | Winnard ...................... 211/70.6 |
| 8,336,709 | B1 | * | 12/2012 | Geibel ......................... 206/378 |
| 8,733,561 | B2 | * | 5/2014 | Kao .............................. 211/70.6 |
| 8,813,957 | B1 | * | 8/2014 | Kao .............................. 206/378 |
| 2005/0247653 | A1 | * | 11/2005 | Brooks ...................... 211/94.01 |
| 2006/0219647 | A1 | * | 10/2006 | Shih ............................. 211/70.6 |
| 2007/0210021 | A1 | * | 9/2007 | Whitehead et al. .......... 211/70.6 |
| 2008/0251476 | A1 | * | 10/2008 | Shiao ........................... 211/70.6 |
| 2010/0065520 | A1 | * | 3/2010 | Hsieh ........................... 211/70.6 |
| 2010/0314978 | A1 | * | 12/2010 | Manalang et al. ............ 312/243 |
| 2011/0192810 | A1 | * | 8/2011 | Kao .............................. 211/70.6 |
| 2013/0306581 | A1 | * | 11/2013 | Kao .............................. 211/49.1 |
| 2015/0034572 | A1 | * | 2/2015 | Kao .............................. 211/13.1 |

* cited by examiner

*Primary Examiner* — Patrick Hawn
(74) *Attorney, Agent, or Firm* — Alan D. Kamrath; Kamrath IP Lawfirm, P.A.

(57) ABSTRACT

A magnetic hanging frame for socket bits has a track disc, a holding device and a magnetic device. The track disc has a baseboard, multiple positioning racks, multiple positioning blocks, at least one mounting rack and multiple holding racks. The holding device is connected to the track disc. The magnetic device is connected to the track disc or is connected to the holding device and has at least two attracting modules, and each attracting module has an outer base and at least one magnet block. The outer base is mounted in the at least one mounting rack or is mounted in the holding device. The at least one magnet block is securely mounted on the outer base.

9 Claims, 15 Drawing Sheets

MAGNETIC HANGING FRAME FOR SOCKET BITS

BACKGROUND OF THE INVENTION

1. Field of the Invention

The present invention relates to a magnetic hanging frame, and more particularly to a magnetic hanging frame for socket bits that can be mounted on a sidewall of a tool cabinet conveniently.

2. Description of the Prior Art

A conventional hanging frame for socket bits has a track disc and multiple positioning blocks. The track disc has a front surface and multiple racks. The racks are formed in the front surface of the track disc at intervals. The positioning blocks are slidably mounted in the racks of the track disc. The user can store and display the socket bits by mounting the socket bits around the positioning blocks.

However, though the conventional hanging frame for socket bits can position the socket bits, the conventional hanging frame cannot be mounted on a sidewall of a tool cabinet and needs a large space for storage, and this is inconvenient in use.

To overcome the shortcomings, the present invention provides a magnetic hanging frame for socket bits to mitigate the aforementioned problems.

SUMMARY OF THE INVENTION

The main objective of the present invention is to provide a magnetic hanging frame for socket bits that can be mounted on a sidewall of a tool cabinet conveniently.

The magnetic hanging frame for socket bits in accordance with the present invention has a track disc, a holding device and a magnetic device. The track disc has a baseboard, multiple positioning racks, multiple positioning blocks, at least one mounting rack and multiple holding racks. The holding device is connected to the track disc. The magnetic device is connected to the track disc or is connected to the holding device and has at least two attracting modules, and each attracting module has an outer base and at least one magnet block. The outer base is mounted in the at least one mounting rack or is mounted in the holding device. The at least one magnet block is securely mounted on the outer base.

Other objects, advantages and novel features of the invention will become more apparent from the following detailed description when taken in conjunction with the accompanying drawings.

DETAILED DESCRIPTION OF THE PREFERRED EMBODIMENT

Figure 1:
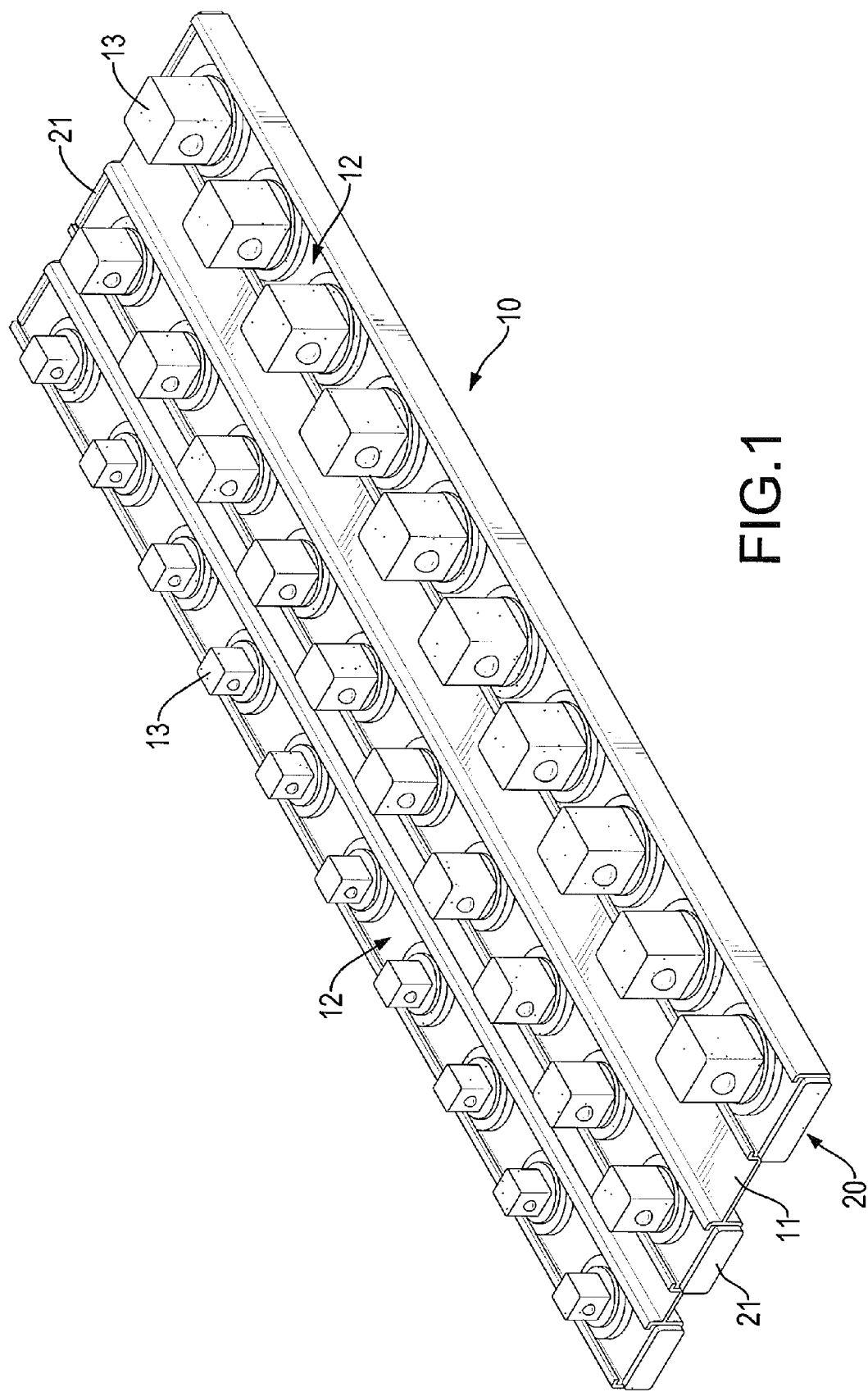
FIG. 1 is a front perspective view of a first embodiment of a magnetic hanging frame in accordance with the present invention.
Figure 2:
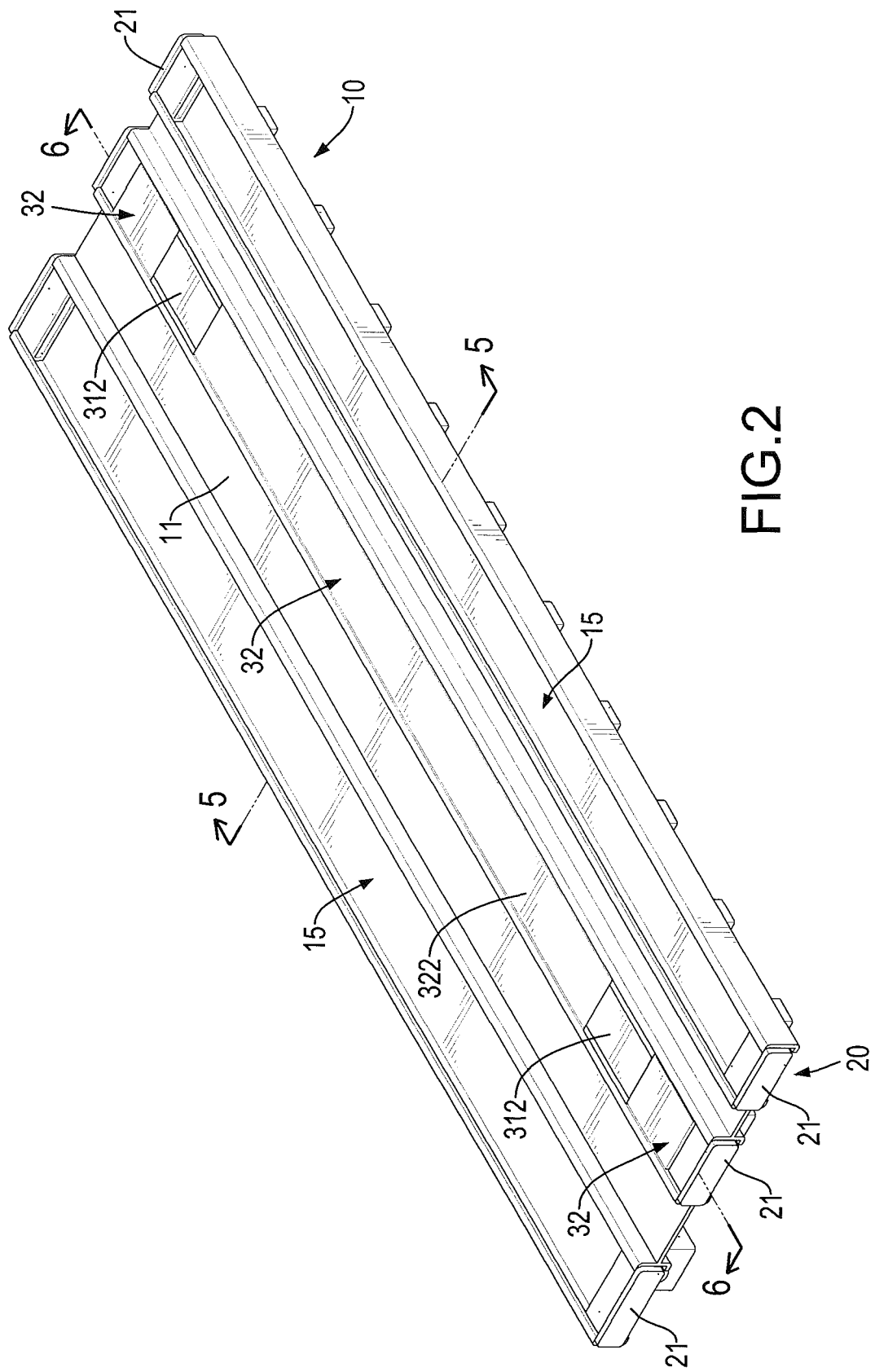
FIG. 2 is a rear perspective view of the magnetic hanging frame in FIG. 1.
Figure 3:
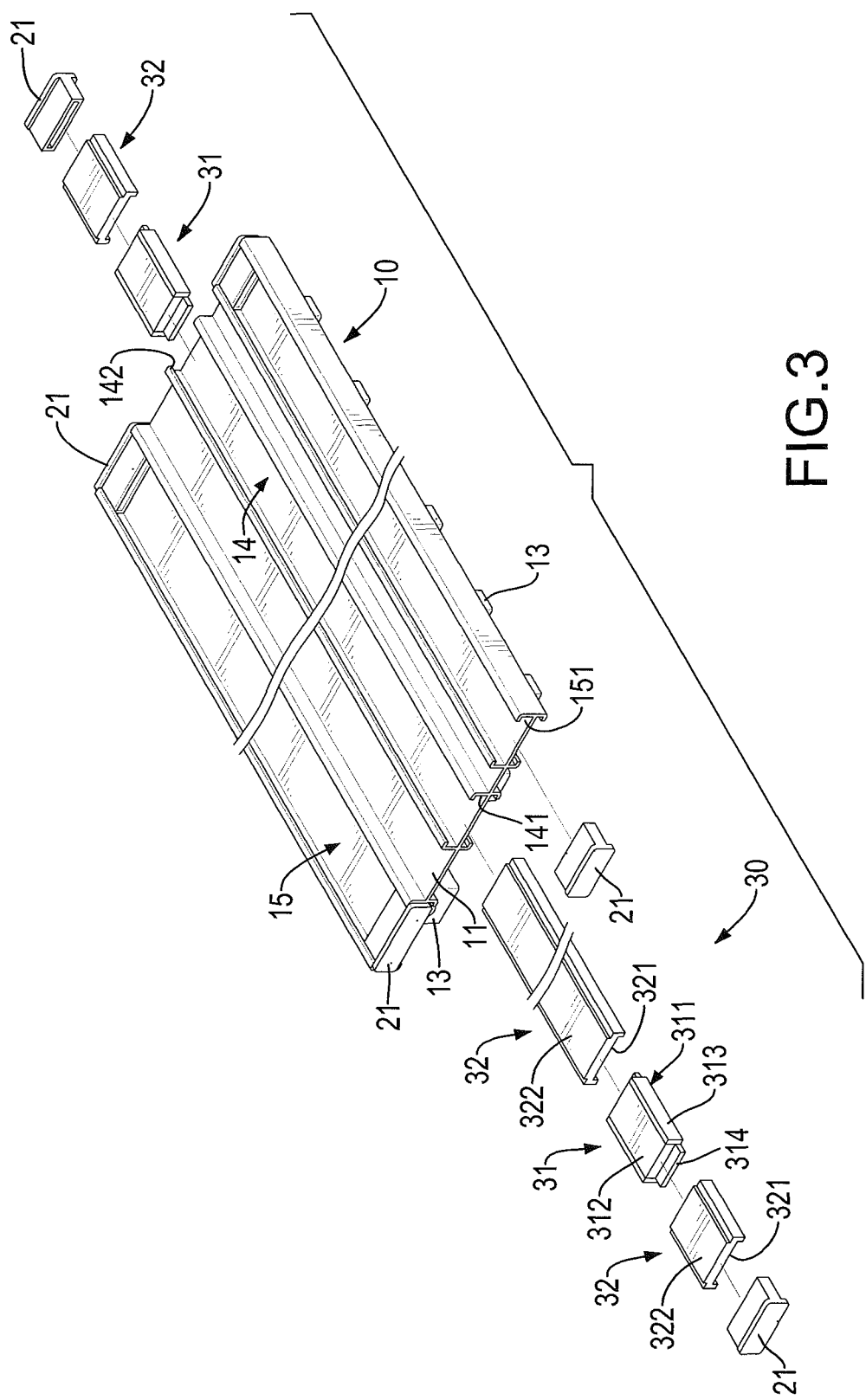
FIG. 3 is an exploded rear perspective view of the magnetic hanging frame in FIG. 2.

With reference to FIGS. 1 to 3, a first embodiment of a magnetic hanging frame for socket bits in accordance with the present invention has a track disc 10, a holding device 20 and a magnetic device 30.

The track disc 10 is made by aluminum extrusion, is elongated and has a baseboard 11, multiple positioning racks 12, multiple positioning blocks 13, at least one mounting rack 14 and multiple holding racks 15.

The baseboard 11 may be rectangular in shape and has a top surface, a bottom surface, a length, and two opposite sides including a first side and a second side. The positioning racks 12 are formed on and protrude from the top surface of the baseboard 11 at intervals, and each positioning rack 12 has a length equal to the length of the baseboard 11. The positioning blocks 13 are mounted slidably in the positioning racks 12 of the track disc 10 to hold socket bits on the track disc 10.

The at least one mounting rack 14 is formed on and protrudes from the bottom surface of the baseboard 11, and each one of the at least one mounting rack 14 has a width (W), a top surface, a bottom surface, two sides, two side openings 141 and a mouth 142. The side openings 141 are respectively formed through the sides of the mounting rack 14 and communicate with the mounting rack 14. The mouth 142 is formed through the top surface of the mounting rack 14 and has a width (M) narrower than the width (W) of the mounting rack 14 (M<W). The holding racks 15 are formed on and protrude from the bottom surface of the baseboard 11 and beside the at least one mounting rack 14, and each holding rack 15 has two sides and two side openings 151. The side openings 151 are respectively formed through the sides of the holding rack 15 and communicate with the holding rack 15.

The holding device 20 is detachably connected to the track disc 10 and has multiple closing blocks 21. The closing blocks 21 are respectively mounted in the side openings 141, 151 of the at least one mounting rack 14 and the holding racks 15 to close the at least mounting rack 14 and the holding racks 15.

Figure 4:
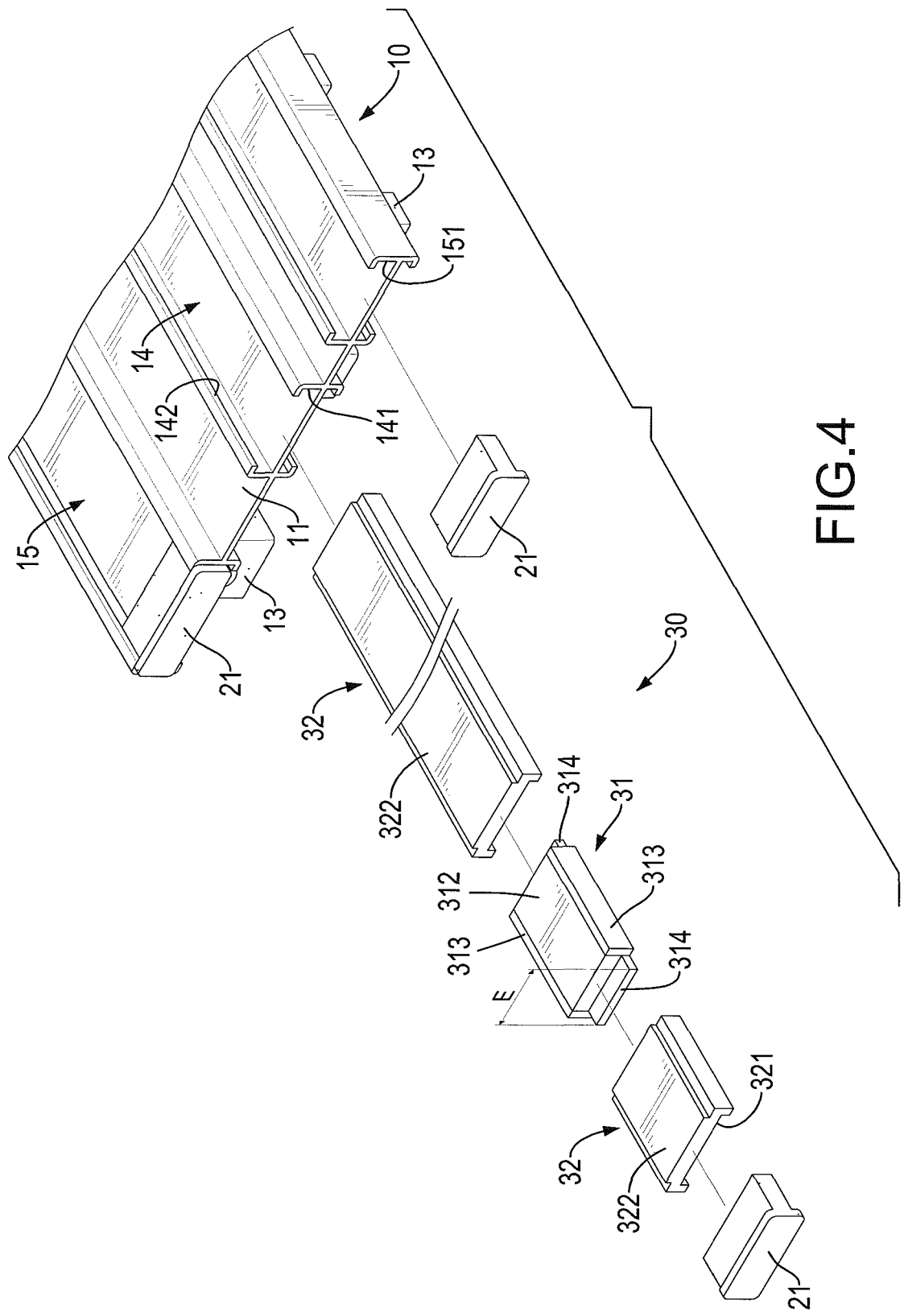
FIG. 4 is an enlarged and exploded rear perspective view of the magnetic hanging frame in FIG. 3.

With referenced to FIGS. 3 and 4, the magnetic device 30 is connected to the track disc 10 and has at least one magnet mount 31 and at least two locating mounts 32.

The at least one magnet mount 31 is made of metal, is slidably mounted in the at least one mounting rack 14 and has an outer base 311 and at least one magnet block 312. The outer base 311 is slidably mounted in the at least one mounting rack 14 and has a bottom, two sidewalls 313 and two extending wings 314. The bottom of the outer base 311 abuts the bottom surface of the at least one mounting rack 14 and has two opposite sides. The sidewalls 313 are upwardly formed on and protrude from the bottom of the outer base 311 into the mouth 142 of the at least one mounting rack 14 and face to each other. The extending wings 314 are respectively formed with the opposite sides of the bottom of the outer base 311 and extend out of the sidewalls 313 of the outer base 311, and each one of the extending wings 314 has a width (E). With further referenced to FIG. 6, the at least one magnet block 312 is magnetically mounted on the bottom of the outer base 311 between the sidewalls 313 and the extending wings 314.

Figure 5:
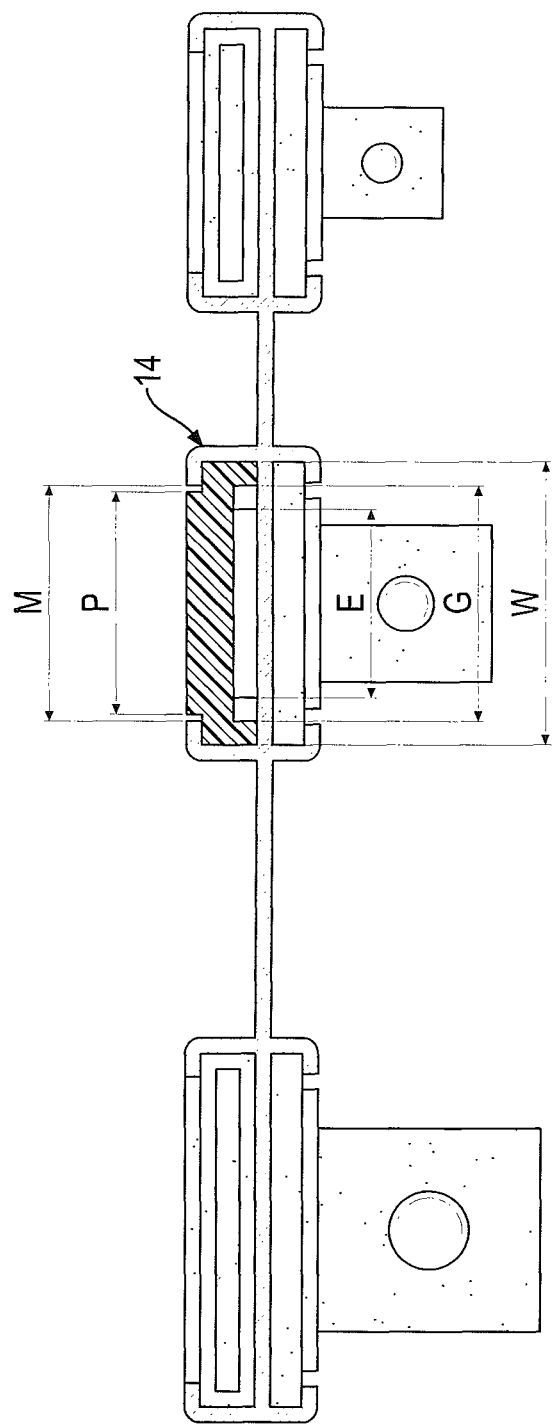
FIG. 5 is an enlarged side view in partial section of the magnetic hanging frame across line 5-5 in FIG. 2.
Figure 6:
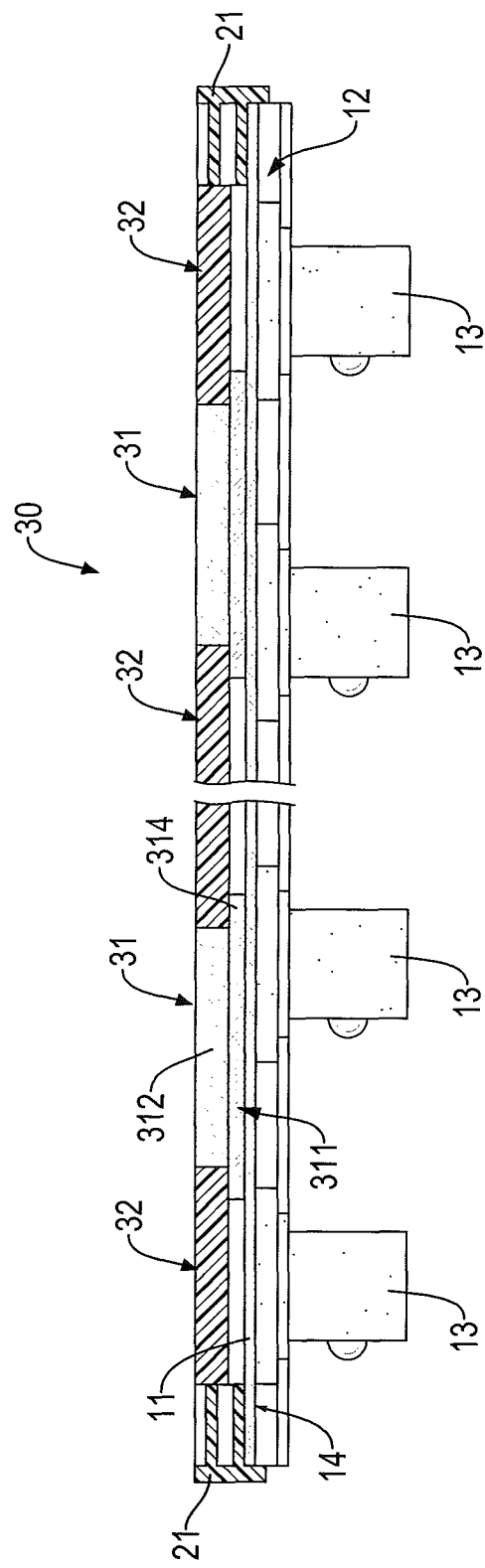
FIG. 6 is an enlarged side view in partial section of the magnetic hanging frame across line 6-6 in FIG. 2.

With referenced to FIGS. 4 to 6, the at least two locating mounts 32 are slidably mounted in the at least one mounting rack 14, abut against the at least one magnet mount 31 and two of the closing blocks 21 that are mounted in the side openings 141 of the at least one mounting rack 14 to hold the at least one magnet mount 31 securely in the at least one mounting rack 14. Each one of the at least two locating mounts 32 has a bottom, a top, a locating groove 321 and a middle protrusion 322. The bottom of the locating mount 32 abuts the bottom surface of the at least one mounting rack 14 and has two sides. One of the sides of the bottom of the locating mount 32 abuts against the sidewalls 313 and the at least one magnet block 312 of the at least one magnet mount 31.

The locating groove 321 is formed through the sides of the bottom of the locating mount 32, accommodates one of the extending wings 314 and has a width (G) wider than the width (E) of the extending wing 314 (G>E). That is, the at least one magnet mount 31 is held in the at least one mounting rack 14 by the locating grooves 321 of the at least two locating mounts 32 mounted around the extending wings 314 of the at least one magnet mount 31.

Figure 7:
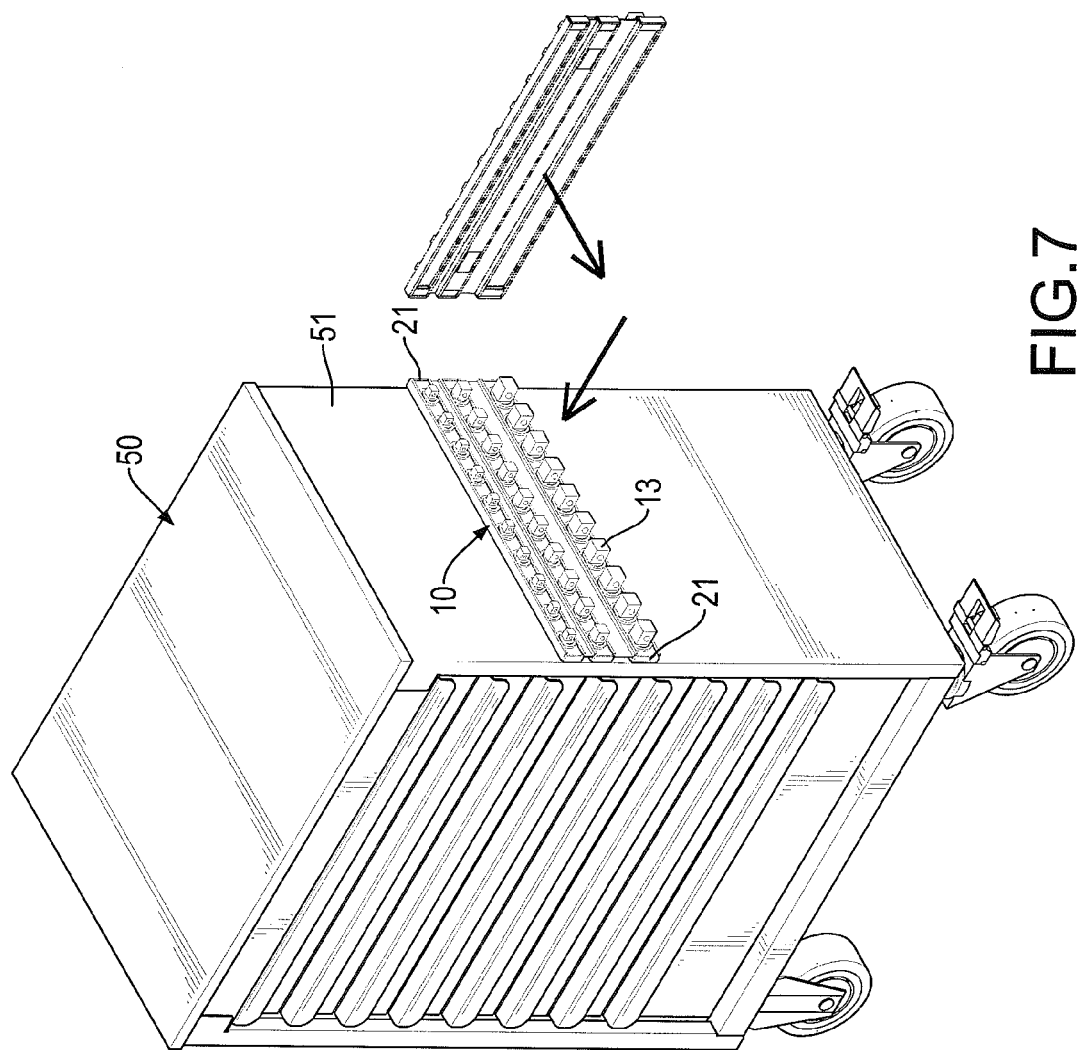
FIG. 7 is an operational perspective view of the magnetic hanging frame in FIG. 1, mounted on a sidewall of a tool cabinet.

The middle protrusion 322 is upwardly formed on and protrudes from the top of the locating mount 32, extends into the mouth 142 of the at least one mounting rack 14 and has a width (P) narrower than the width (M) of the mouth 142 of the at least one mounting rack 14 (P<M). Preferably, in the first embodiment of the present invention, the magnetic device 30 has two magnet mounts 31 and three locating mounts 32 mounted in the at least one mounting rack 14 of the track disc 10. The three locating mounts 32 are mounted between two of the closing blocks 21 of the holding device 20 and the two magnet mounts 31 to hold the magnet mounts 31 securely in the at least one mounting rack 14. In operation, with referenced to FIGS. 1, 2 and 7, the user can store socket bits by mounting the socket bits around the positioning blocks 13 of the track disc 10. After mounting and storing the socket bits with the track disc 10, the user can mount the magnetic hanging frame on a sidewall 51 of a tool cabinet 50 conveniently by the magnetic forces of the at least one magnet block 312 of the at least one magnet mount 31 attracted to the sidewall 51 of the tool cabinet 50. Then, the socket bits can be mounted and displayed on the sidewall 51 of the tool cabinet 50 with the magnetic hanging frame. Accordingly, no space in the tool cabinet 50 is needed for storing the magnetic hanging frame.

Figure 8:
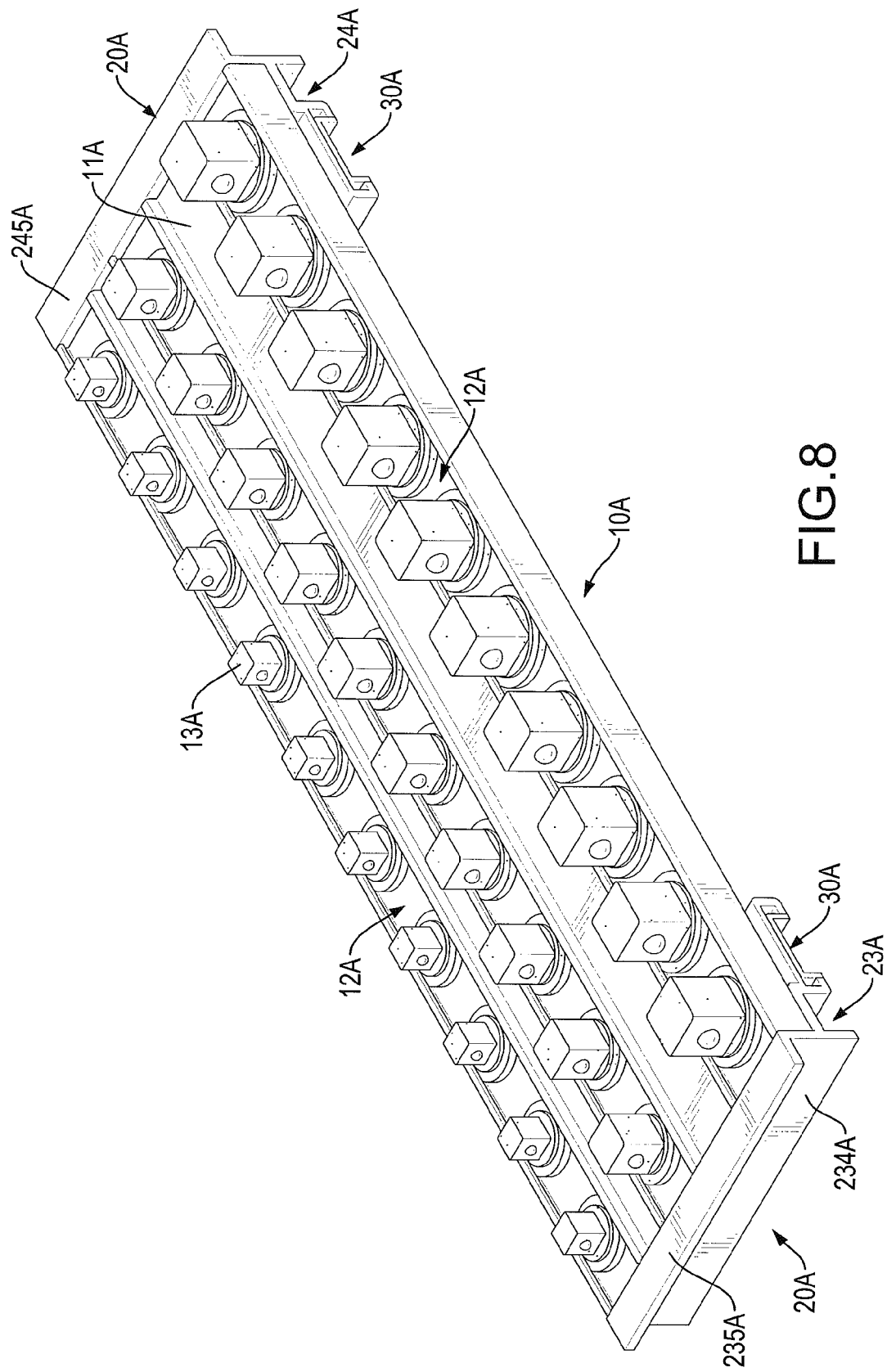
FIG. 8 is a front perspective view of a second embodiment of a magnetic hanging frame in accordance with the present invention.
Figure 9:
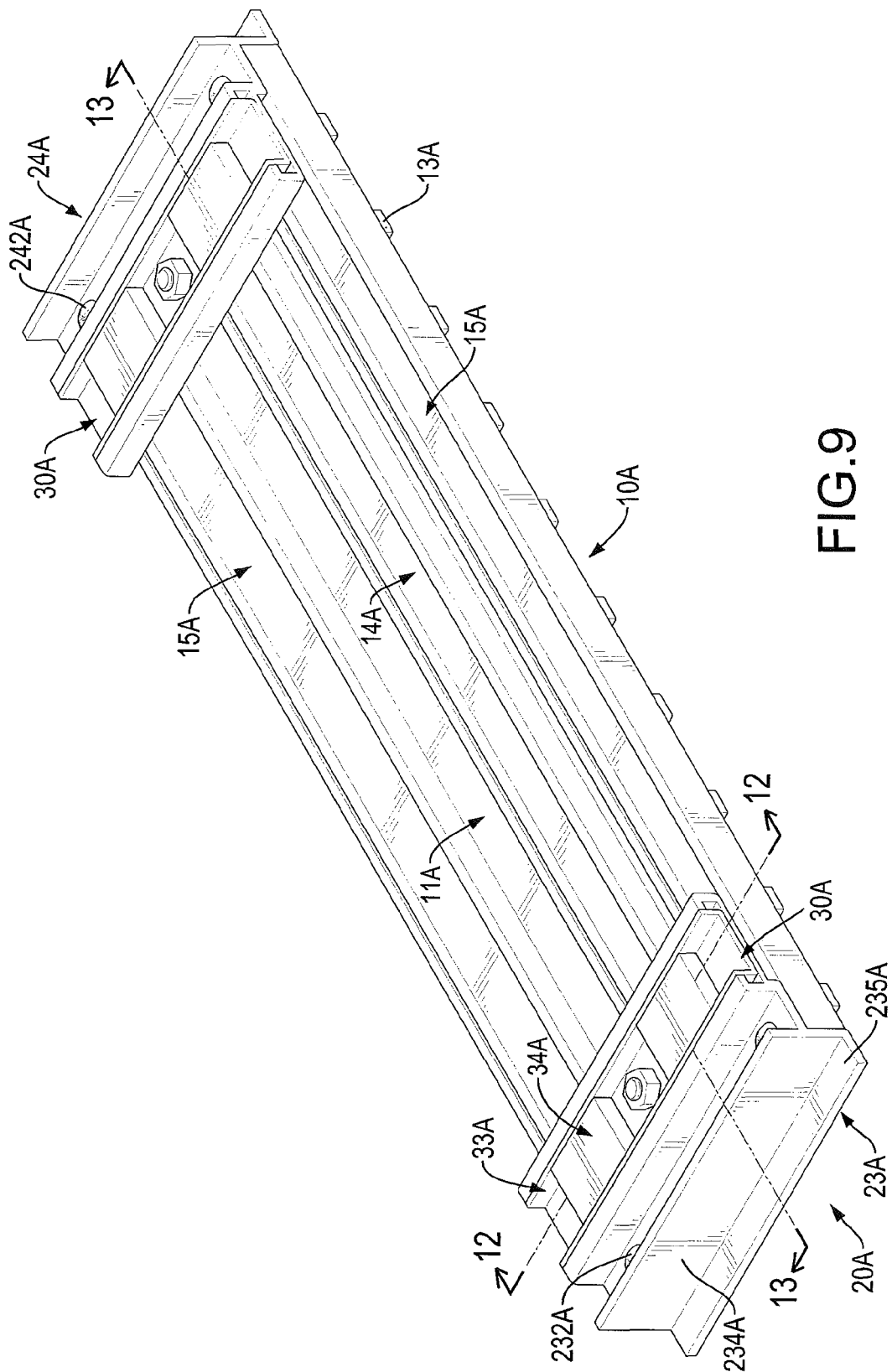
FIG. 9 is a rear perspective view of the magnetic hanging frame in FIG. 8.
Figure 10:
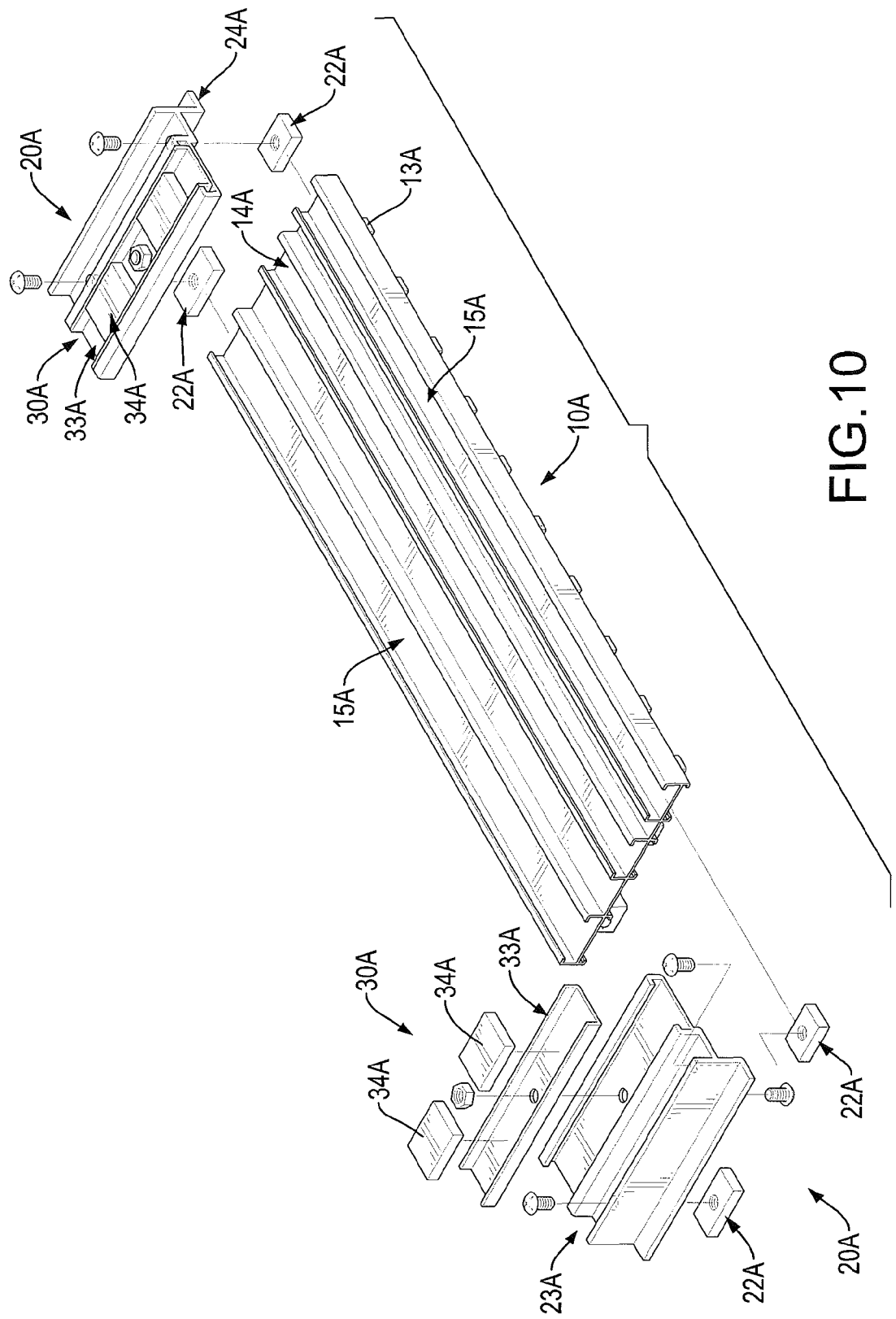
FIG. 10 is an exploded rear perspective view of the magnetic hanging frame in FIG. 9.

With referenced to FIGS. 8 to 10, a second embodiment of a magnetic hanging frame for socket bits in accordance with the present invention has a similar structures as the first embodiment of the magnetic hanging frame for socket bits. The differences between the second embodiment and the first embodiment are the holding device 20A and the magnetic device 30A. In the second embodiment, the track disc 10A also has the baseboard 11A, the positioning racks 12A, the positioning blocks 13A, the at least one mounting rack 14A and the holding racks 15A.

The holding device 20A is detachably connected to the track disc 10A and has multiple fixing boards 22A, a first supporting mount 23A and a second supporting mount 24A. The fixing boards 22A may be quadrate, are movably mounted in the holding racks 15A adjacent to the opposite sides of the baseboard 11A. Each fixing board 22A has a fixing hole 221A formed through the fixing board 22A.

Figure 11:
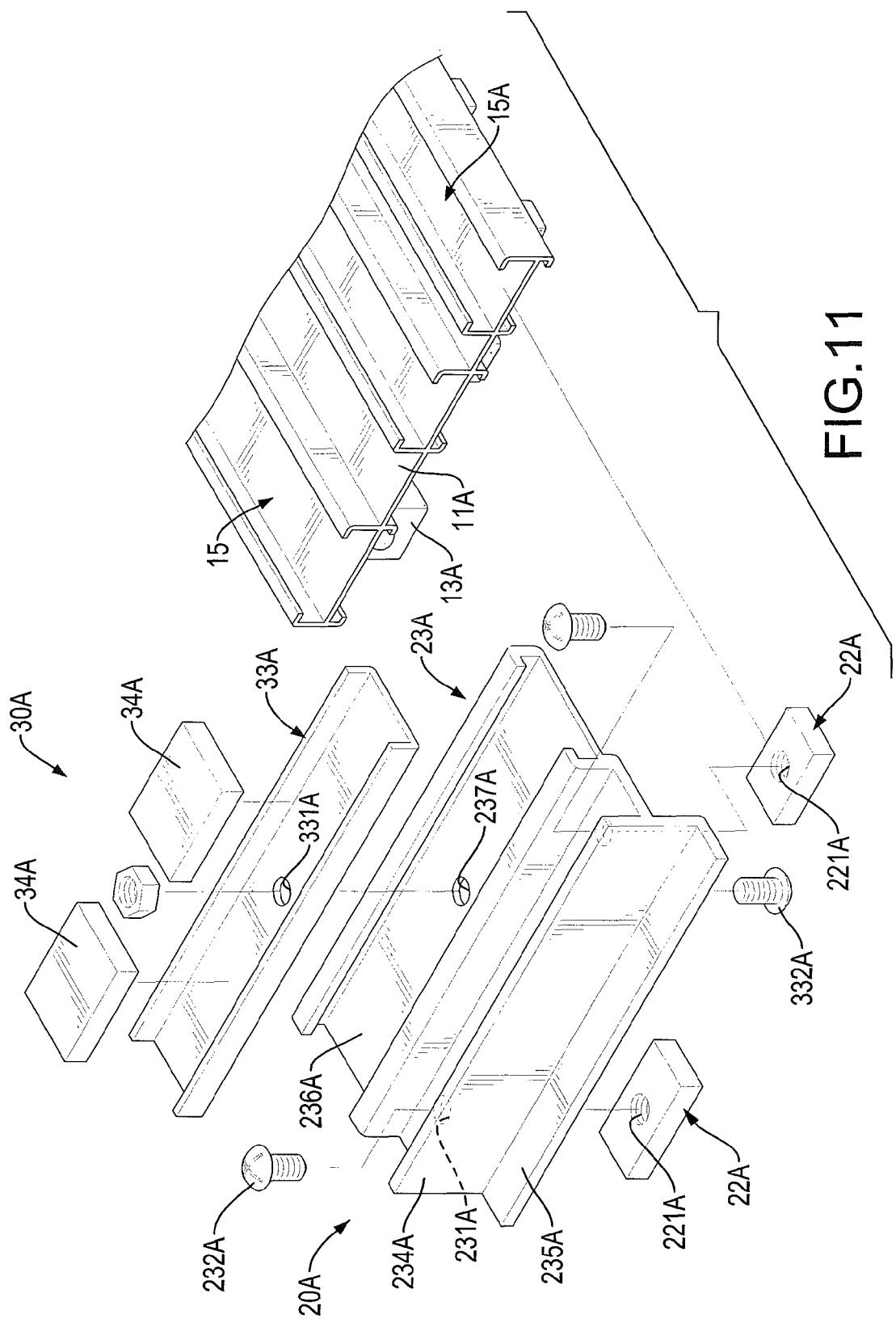
FIG. 11 is an enlarged and exploded rear perspective view of the magnetic hanging frame in FIG. 10.
Figure 12:
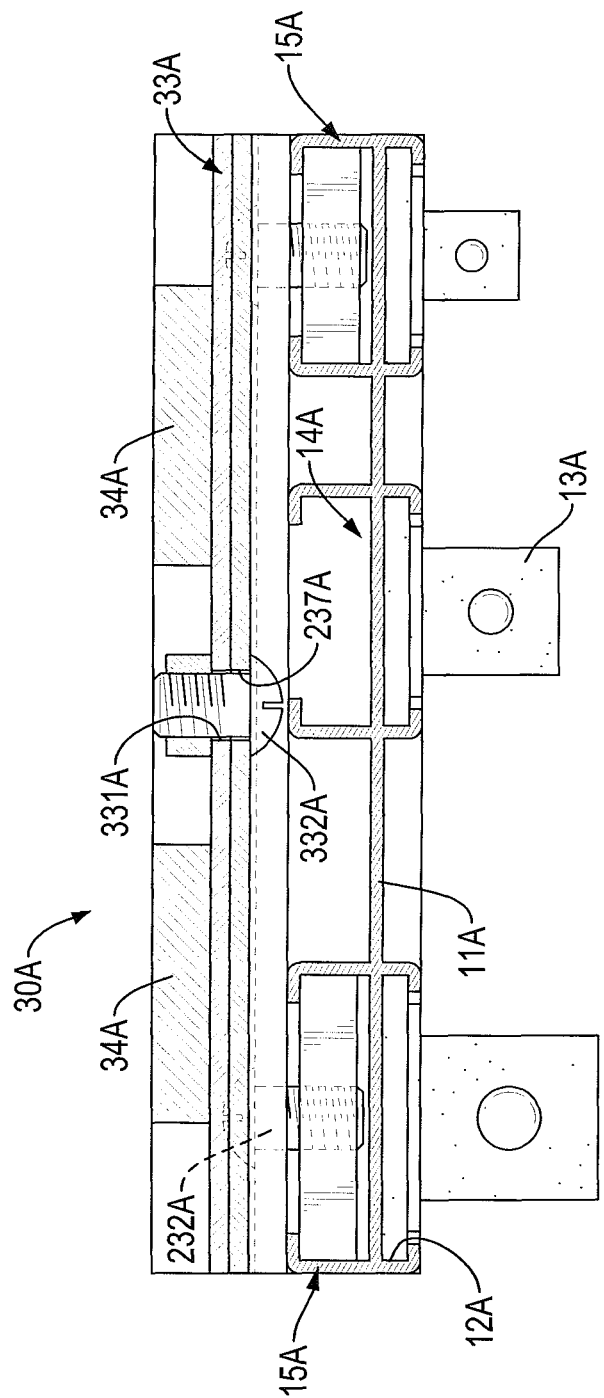
FIG. 12 is an enlarged side view in partial section of the magnetic hanging frame across line 12-12 in FIG. 9.
Figure 13:
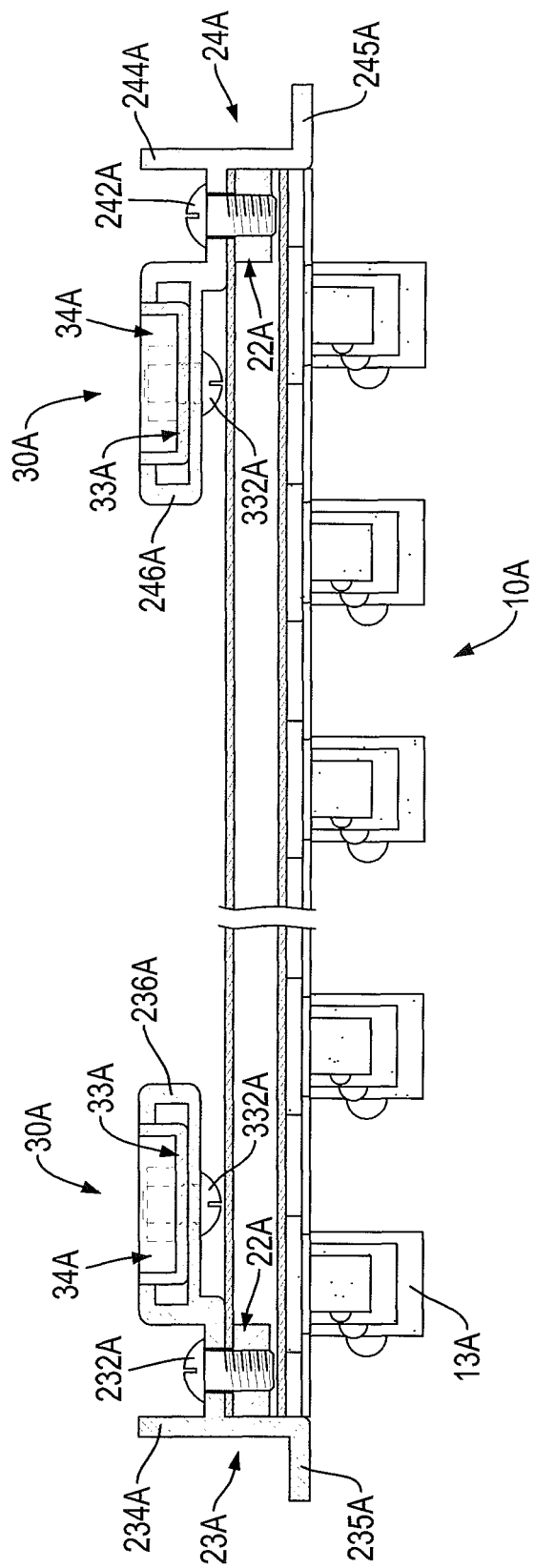
FIG. 13 is an enlarged side view in partial section of the magnetic hanging frame across line 13-13 in FIG. 9.

With further reference to FIGS. 11 to 13, the first supporting mount 23A is made by aluminum extrusion, is connected to the bottom surface and the first side of the baseboard 11A, and has a top, a bottom, an outer side, an inner side, multiple through holes 231A, multiple screw bolts 232A, a side panel 234A, a holding board 235A and a connecting rack 236A. The through holes 231A are formed through the bottom and the top of the first supporting mount 23A at intervals and respectively align with the fixing holes 221A of the fixing boards 22A that are mounted on the first side of the baseboard 11A. The screw bolts 232A are respectively mounted through the through holes 231A of the first supporting mount 23A and are respectively and securely mounted in the fixing holes 221A of the fixing boards 22A via the holding racks 15A to connect the first supporting mount 23A securely to the fixing boards 22A at the first side of the baseboard 11A and to connect the first supporting mount 23A securely to the bottom surface of the baseboard 11A.

The side panel 234A is formed on and upwardly protrudes from the outer side of the first supporting mount 23A to close the positioning racks 12A and the holding racks 15A at the first side of the baseboard 11A to prevent the positioning blocks 13A from separating from the first side of the baseboard 11A. The side panel 234A has a free side. The holding board 235A is formed on and transversally protrudes from the free side of the side panel 234A for a user to hold the holding board 235A. The connecting rack 236A is formed on and transversally protrudes from the inner side of the first supporting mount 23A above the holding racks 15A and the at least one mounting rack 14A at the first side of the baseboard 11A and has a connecting hole 237A formed through the connecting rack 236A.

The second supporting mount 24A is made by aluminum extrusion and is connected to the bottom surface and the second side of the baseboard 11A. The second supporting mount 24A has a top, a bottom, an outer side, an inner side, multiple through holes 241A, multiple screw bolts 242A, a side panel 244A, a holding board 245A and a connecting rack 246A. The through holes 241A are formed through the top and the bottom of the second supporting mount 24A at intervals and respectively align with the fixing holes 221A of the fixing boards 22A that are mounted on the second side of the baseboard 11A. The screw bolts 242A are respectively mounted through the through holes 241A of the second supporting mount 24A and are respectively and securely mounted in the fixing holes 221A of the fixing boards 22A via the holding racks 15A to connect the second supporting mount 24A securely with the fixing boards 22A at the second side of the baseboard 11A and to connect the second supporting mount 24A securely to the bottom surface of the baseboard 11A.

The side panel 244A is formed on and upwardly protrudes from the outer side of the second supporting mount 24A to close the positioning racks 12A and the holding racks 15A at the second side of the baseboard 11A to prevent the positioning blocks 13A from separating from the second side of the baseboard 11A. The side panel 244A has a free side. The holding board 245A is formed on and transversally protrudes from the free side of the side panel 244A for a user to hold the holding board 245A. The connecting rack 246A is formed on and transversally protrudes from the inner side of the second supporting mount 24A above the holding racks 15A and the at least one mounting rack 14A at the second side of the baseboard 11A, and has a connecting hole 247A formed through the connecting rack 246A.

Accordingly, the supporting mounts 23A, 24A are respectively connected to the opposite sides of the baseboard 11A to reinforce the structural strength of the track disc 10A.

The magnetic device 30A is connected to the track disc 10A and has at least two attracting modules, and each one of the attracting modules has an outer base 33A and at least one magnet block 34A.

The outer base 33A is made of metal, is mounted securely in the connecting rack 236A, 246A of one of the supporting mounts 23A, 24A and has an outer surface, a mounting hole 331A and a fastener 332A. The mounting hole 331A is formed through the outer base 33A and aligns with the connecting hole 237A, 247A of said one of the supporting mounts 23A, 24A. The fastener 332A is mounted through the connecting hole 237A, 247A of said one of the supporting mounts 23A, 24A and is securely mounted in the mounting hole 331A of the outer base 33A to connect and mount the outer base 33A securely in the connecting rack 236A, 246A of said one of the supporting mounts 23A, 24A.

The at least one magnet block 34A is magnetically mounted on the outer surface of the outer base 33A. Preferably, each one of the attracting modules has two magnet blocks 34A securely mounted on the outer surface of the outer base 33A beside the fastener 332A.

Figure 15:
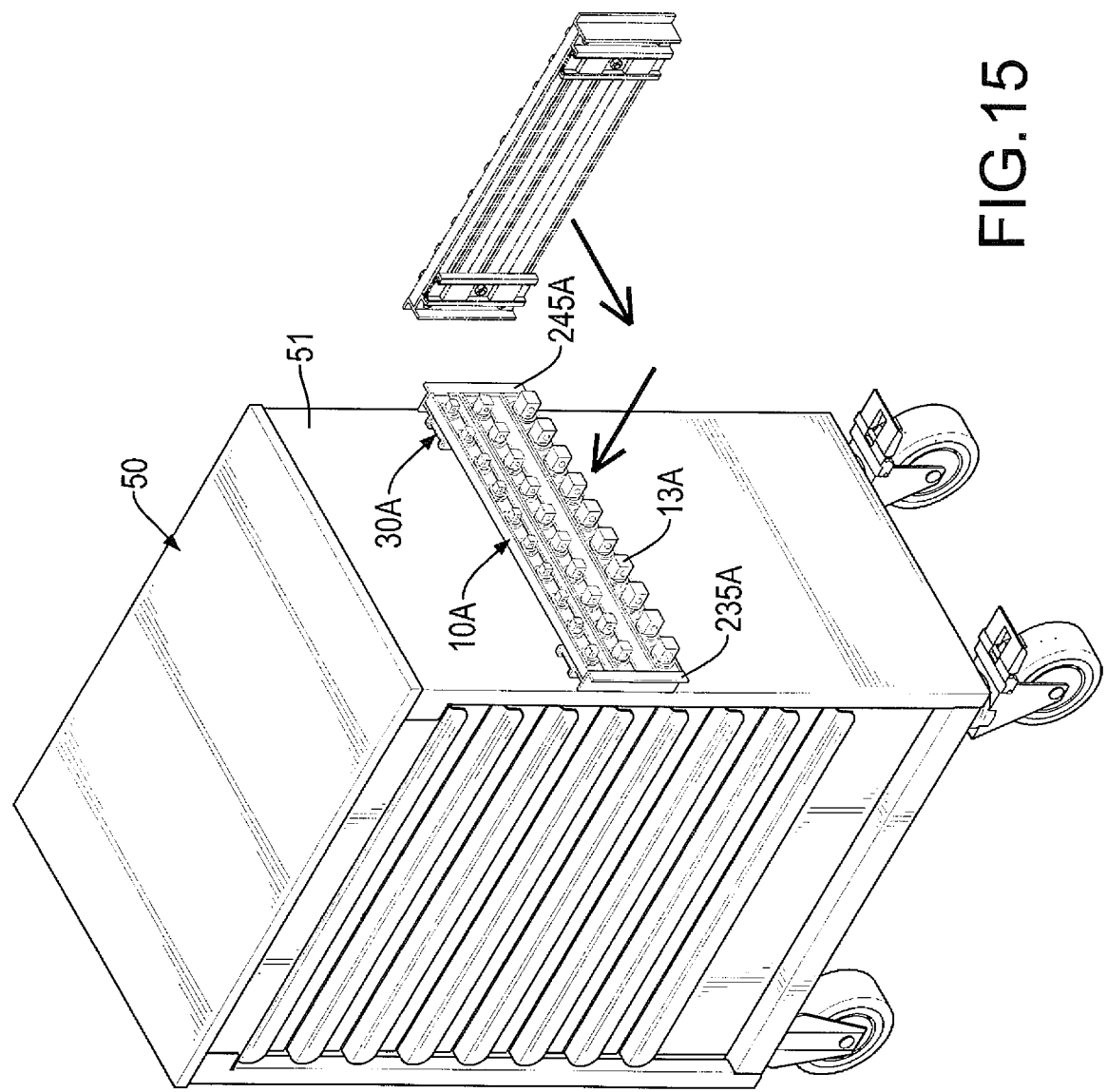
FIG. 15 is an operational perspective view of the magnetic hanging frame in FIG. 8, mounted on a sidewall of a tool cabinet.

When using the second embodiment of the magnetic hanging frame for socket bits in accordance with the present invention, the user can store socket bits by mounting the socket bits around the positioning blocks 13A of the track disc 10A. After mounting and storing the socket bits with the track disc 10A, the user can mount the magnetic hanging frame on a sidewall 51 of a tool cabinet 50 conveniently by the magnetic forces of the magnet blocks 34A attracted to the sidewall 51 of the tool cabinet 50. Then, the socket bits can be mounted and displayed on the sidewall 51 of the tool cabinet 50 with the magnetic hanging frame as shown in FIG. 15. Accordingly, no space in the tool cabinet 50 is needed for storing the magnetic hanging frame.

Figure 14:
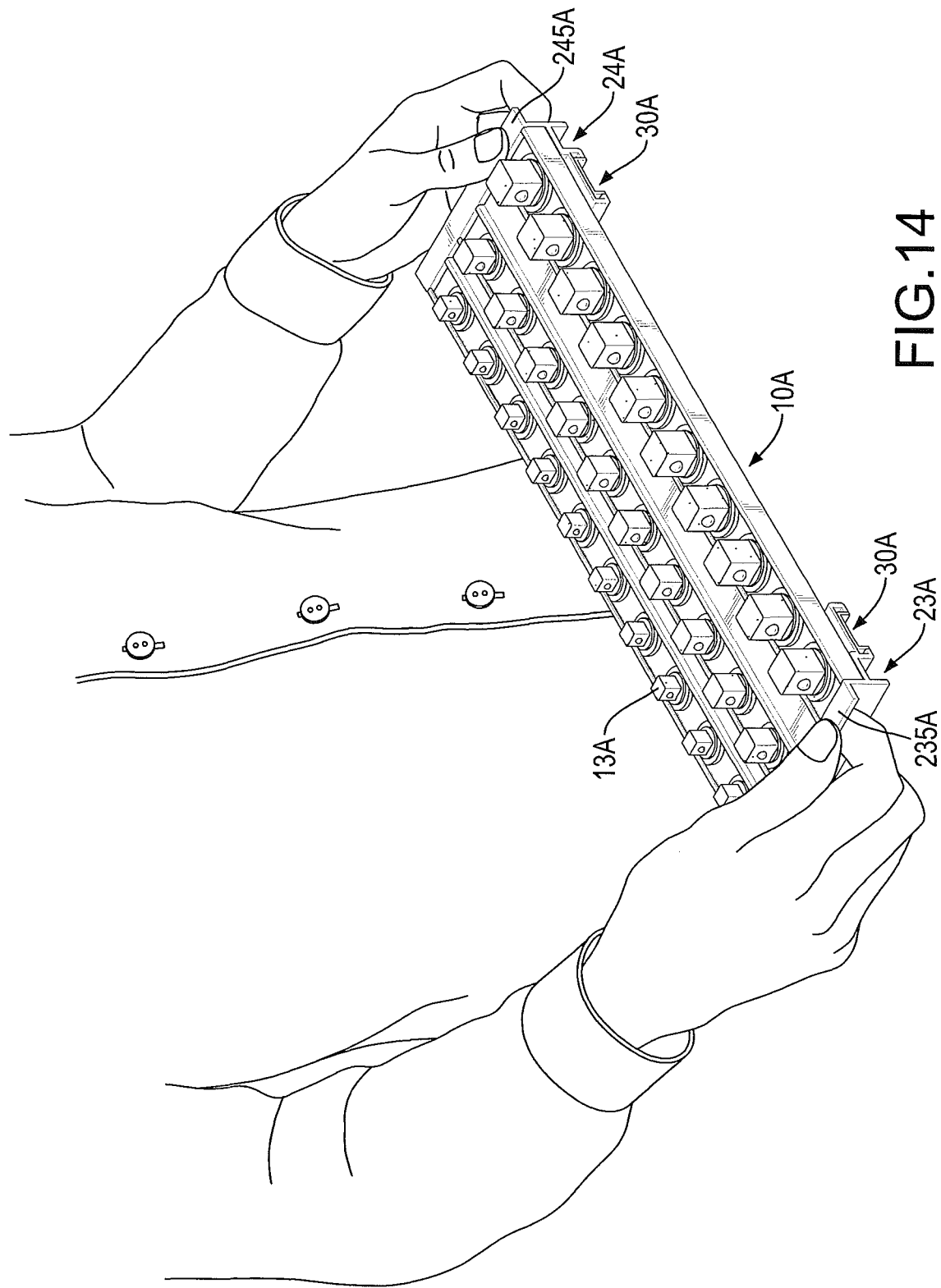
FIG. 14 is an operational perspective view of the magnetic hanging frame in FIG. 8, held by a user.

In addition, with further reference to FIG. 13, the holding device 20A and the magnetic device 30A are mounted on the bottom surface of the baseboard 11A and this can prevent the holding racks 15A and the at least one mounting rack 14A from scratching the sidewall 51 of the tool cabinet 50 when the magnetic hanging frame is mounted on the sidewall 51 of the tool cabinet 50. Furthermore, with reference to FIG. 14, the holding boards 235A, 245A of the supporting mounts 23A, 24A respectively extend out of the opposite sides of the baseboard 11A of the track disc 10A. Then, the user can carry the magnetic hanging frame conveniently by holding the holding boards 235A, 245A by hands.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic hanging frame for socket bits comprising:
   a track disc having
      a baseboard having
         a top surface;
         a bottom surface; and
         two opposite sides including a first side and a second side;
      multiple positioning racks formed on and protruding from the top surface of the baseboard at intervals;
      multiple positioning blocks mounted slidably in the positioning racks of the track disc;
      at least one mounting rack formed on and protruding from the bottom surface of the baseboard, and each one of the at least one mounting rack having a bottom surface, two sides and two side openings respectively formed through the sides of the mounting rack and communicating with the mounting rack; and
      multiple holding racks formed on and protruding from the bottom surface of the baseboard and beside the at least one mounting rack, and each one of the holding racks having two sides and two side openings respectively formed through the sides of the holding rack and communicating with the holding rack;
   a holding device detachably connected to the track disc and having multiple closing blocks respectively mounted in the side openings of the at least one mounting rack and the side openings of the holding racks to close the at least mounting rack and the holding racks; and
   a magnetic device connected to the track disc and having
      at least one magnet mount slidably mounted in the at least one mounting rack of the track disc and having
         an outer base slidably mounted in the at least one mounting rack of the track disc and having a bottom abutting the bottom surface of the at least one mounting rack, and the bottom of the at least one magnet mount having two opposite sides;
         at least one magnet block securely mounted on the bottom of the outer base; and
      at least two locating mounts slidably mounted in the at least one mounting rack, abutting against the at least one magnet mount and two of the closing blocks that are mounted in the side openings of the at least one mounting rack to hold the at least one magnet mount securely in the at least one mounting rack.

2. The magnetic hanging frame as claimed in claim 1, wherein
   the outer base of each one of the at least one magnet mount has
      two sidewalls upwardly formed on and protruding from the bottom of the outer base and facing to each other; and
      two extending wings respectively formed with the opposite sides of the bottom of the outer base and extending out of the sidewalls of the outer base; and
   the at least one magnet block of each one of the at least one magnet mount is securely mounted on the bottom of the outer base between the sidewalls and the extending wings of the magnet mount;
   each one of the at least two locating mounts has
      a bottom abutting the bottom surface of the at least one mounting rack and having two sides, and one of the sides of the bottom of the locating mount abutting against the sidewalls and the at least one magnet block of the at least one magnet mount;
      a top; and
      a locating groove formed through the sides of the bottom of the locating mount and accommodating one of the extending wings.

3. The magnetic hanging frame as claimed in claim 2, wherein each one of the at least one mounting rack has
a width;
a top surface; and
a mouth formed through the top surface of the mounting rack and having a width narrower than the width of the mounting rack; and
the sidewalls of each one of the at least one magnet mount extend into the mouth of the at least one mounting rack.

4. The magnetic hanging frame as claimed in claim 3, wherein
each one of the extending wings of the outer base of each one of the at least one magnet mount has a width; and
the locating groove of each one of the at least two locating mounts has a width wider than the width of the extending wing.

5. The magnetic hanging frame as claimed in claim 4, wherein each one of the at least two locating mounts has a middle protrusion upwardly formed on and protruding from the top of the locating mount, extending into the mouth of the at least one mounting rack and having a width narrower than the width of the mouth of the at least one mounting rack.

6. A magnetic hanging frame for socket bits comprising:
a track disc having
a baseboard having
a top surface;
a bottom surface; and
two opposite sides including a first side and a second side;
multiple positioning racks formed on and protruding from the top surface of the baseboard at intervals;
multiple positioning blocks mounted slidably in the positioning racks of the track disc; and
multiple holding racks formed on and protruding from the bottom surface of the baseboard;
a holding device detachably connected to the track disc and having
multiple fixing boards movably mounted in the holding racks adjacent to the opposite sides of the baseboard, and each fixing board having a fixing hole formed through the fixing board;
a first supporting mount connected to the bottom surface and the first side of the baseboard and having
a top;
a bottom;
an inner side;
multiple through holes formed through the bottom and the top of the first supporting mount at intervals and respectively aligning with the fixing holes of the fixing boards that are mounted on the first side of the baseboard;
multiple screw bolts respectively mounted through the through holes of the first supporting mount and respectively and securely mounted in the fixing holes of the fixing boards via the holding racks to connect the first supporting mount securely to the fixing boards at the first side of the baseboard and to connect the first supporting mount securely to the bottom surface of the baseboard; and
a connecting rack formed on and transversally protruding from the inner side of the first supporting mount above the holding racks at the first side of the baseboard; and
a second supporting mount connected to the bottom surface and the second side of the baseboard, and having
a top;
a bottom;
an inner side;
multiple through holes formed through the top and the bottom of the second supporting mount at intervals and respectively aligning with the fixing holes of the fixing boards that are mounted on the second side of the baseboard;
multiple screw bolts respectively mounted through the through holes of the second supporting mount and respectively and securely mounted in the fixing holes of the fixing boards via the holding racks to connect the second supporting mount securely with the fixing boards at the second side of the baseboard and to connect the second supporting mount securely to the bottom surface of the baseboard; and
a connecting rack formed on and transversally protruding from the inner side of the second supporting mount above the holding racks at the second side of the baseboard; and
a magnetic device connected to the track disc and having
at least two attracting modules, and each one of the attracting modules having
an outer base mounted securely in the connecting rack of one of the supporting mounts and having an outer surface; and
at least one magnet block mounted on the outer surface of the outer base.

7. The magnetic hanging frame as claimed in claim 6, wherein
the connecting rack of the first supporting mount has a connecting hole formed through the connecting rack of the first supporting mount;
the connecting rack of the second supporting mount has a connecting hole formed through the connecting rack of the second supporting mount; and
the outer base of each one of the attracting modules has
a mounting hole formed through the outer base and aligning with the connecting hole of one of the supporting mounts; and
a fastener mounted through the connecting hole of said one of the supporting mounts and securely mounted in the mounting hole of the outer base to connect the outer base securely mounted in the connecting rack of said one of the supporting mounts.

8. The magnetic hanging frame as claimed in claim 7, wherein
the first supporting mount has
an outer side;
a side panel formed on and upwardly protruding from the outer side of the first supporting mount to close the positioning racks and the holding racks at the first side of the baseboard to prevent the positioning blocks from separating from the first side of the baseboard, and the side panel having a free side; and
a holding board formed on and transversally protruding from the free side of the side panel; and
the second supporting mount has
an outer side;
a side panel formed on and upwardly protruding from the outer side of the second supporting mount to close the positioning racks and the holding racks at the second side of the baseboard to prevent the positioning blocks from separating from the second side of the baseboard; and
a holding board formed on and transversally protruding from the free side of the side panel of the second supporting mount.

9. The magnetic hanging frame as claimed in claim 6, wherein
- the first supporting mount has
  - an outer side;
  - a side panel formed on and upwardly protruding from the outer side of the first supporting mount to close the positioning racks and the holding racks at the first side of the baseboard to prevent the positioning blocks from separating from the first side of the baseboard, and the side panel having a free side; and
  - a holding board formed on and transversally protruding from the free side of the side panel; and
- the second supporting mount has
  - an outer side;
  - a side panel formed on and upwardly protruding from the outer side of the second supporting mount to close the positioning racks and the holding racks at the second side of the baseboard to prevent the positioning blocks from separating from the second side of the baseboard; and
  - a holding board formed on and transversally protruding from the free side of the side panel of the second supporting mount.

\* \* \* \* \*